United States Patent Office 2,830,096
Patented Apr. 8, 1958

2,830,096

POLYALKYLPHENYLPENTENYL HALIDES

Earl W. Lane, Philadelphia, Pa., assignor to Rohm & Haas Company, Philadelphia, Pa., a corporation of Delaware No Drawing. Application July 13, 1954
Serial No. 443,151

15 Claims. (Cl. 260—651)

This invention relates to polyalkylphenylpentenyl halides as new compositions of matter. It also relates to a method for the preparation of the polyalkylphenylpentenyl halides.

The present invention is concerned with the preparation of polyalkylphenylpentenyl halides by reacting the corresponding polyalkylbenzyl halides with butadiene in the present of a Friedel-Crafts catalyst. The polyalkylphenylpentyl halides contemplated by this invention may be represented by the formula

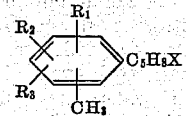

in which $R_1$ is either hydrogen or a methyl group, $R_2$ is either hydrogen or a methyl group, $R_3$ is an alkyl group of one to eighteen carbon atoms, and X is either chlorine or bromine. Typical of the members that may be used as $R_3$ are methyl, ethyl, propyl, butyl, isobutyl, tert-butyl, pentyl, hexyl, octyl, tert-octyl, nonyl, isononyl, decyl, tert-decyl, dodecyl, tetradecyl, hexadecyl, and octadecyl groups. The exact position of the methyl, $R_1$, $R_2$, and $R_3$ groups on the benzene ring is apparently without appreciable significance. While X may represent either chlorine or bromine, generally chlorine is somewhat preferred.

The present reaction is conducted in the presence of a Friedel-Crafts catalyst. Typical of the catalysts that may be employed are zinc chloride, zinc bromide, aluminum chloride, ferric chloride, titanium tetrachloride, stannic chloride, boron trifluoride, or the like. Zinc chloride and zinc bromide are especially suited for the purposes of this invention. The amount of catalyst employed may vary between about 0.5% and 25% by weight, the larger amounts generally producing higher yields. Usually, about 1 to 15%, by weight, of catalyst produces satisfactory results and such is the preferred range. In addition to a Friedel-Crafts catalyst there may be present, in order to accelerate the reaction, glacial acetic acid, glacial formic acid, or the like.

If desired, a solvent may be employed, but such is not necessary. The desire or need for a solvent is minimized by the use of glacial acetic acid, glacial formic acid, or the like, since such serves as a solvent as well as an accelerator. If a solvent is desired there may be used chloroform, ethylene dichloride, or other chlorinated solvents.

Butadiene is introduced at any convenient rate, preferably at a rate that minimizes waste of material. Usually about an hour is sufficient time for the butadiene introduction although such is not critical. Although the butadience unites with its coreactant, the polyalkylbenzyl halide, in a one-to-one molar ratio, it is usually present in some excess in order to assure completeness of reaction.

Compounds having a chemical configuration similar to that of butadiene may be advantageously used in the subject reaction to produce similar products, although usually in reduced yields. Among these compounds are isoprene, hexadiene, and cyclopentadiene.

The time of reaction is not particularly critical. Frequently, within a half hour after the butadiene has been added the reaction is substantially completed. However, the reaction is usually continued for a longer period of time, as desired, in order to obtain the maximum in yields. Frequently, the reaction is allowed to continue for several hours up to 24 or even more, when time is not an important consideration.

The subject reaction can be satisfactorily conducted at normal room temperature, i. e. 20 to 30° C. The reaction is usually carried out in the temperature range of —10 to 75° C., with the preferred range being 10 to 60° C. Actually, the reaction will occur above 75° C. but as the temperature is gradually raised the danger of undesirable side reactions increases. At these higher temperatures there is the possibility that the butadiene may polymerize. There is the further possibility that other undesirable side reactions may occur such as the benzyl chloride group reacting with itself. Therefore, in order to minimize and substantially eliminate the occurrence of reactions other than the principal one, the range of temperatures set forth above is used in the instant invention.

Atmospheric pressure is usually employed, largely as a matter of convenience. Pressures greater than atmospheric may be advantageously used with some improvements in yields usually observed. Apparently, pressures greater than atmospheric tend to confine the butadiene and keep it in reactive contact with its coreactant, the polyalkylbenzyl halide, until maximum yield benefits are realized. Therefore, the elevated pressures are frequently desirable to more fully utilize the butadiene which at the same time tends to increase the yield of the product.

At the conclusion of the reaction, water is added to the reaction mixture. The product layer is washed well with water, then with aqueous 10% sodium carbonate, and then again with water. The product is then stripped, dried, preferably over anhydrous magnesium sulfate, and filtered. If desired, the dried product may be distilled under reduced pressures down to about 0.3 mm. There is evidence that the product of this invention is actually an isomeric mixture. It is believed that a mixture of the isomers

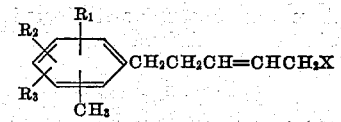

and

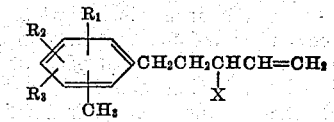

is formed. In any case the product may be represented by the formula

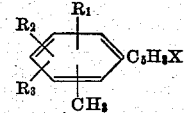

which has been defined above. Yields of the product run as high as about 50%.

The products of the present invention, the polyalkylphenylpentenyl halides, are oily compounds that are useful as pesticides and bactericides. They may be reacted with hydrogen cyanide from which can be made amines, acids, esters, and amides of use as oil additives to inhibit corrosion and to improve viscosity indexes.

The reactants of the present invention, that is, butadienes and the polyalkylphenylmethyl halides, are known compounds.

The polyalkylphenylpentenyl halides may be prepared, according to the present invention, as shown in the following illustrative examples, in which parts by weight are used throughout.

*Example 1*

There were added to a one-liter, three-necked flask, equipped with a stirrer, thermometer, gas dispersion tube, and water-cooled condenser filled with a calcium chloride tube, 166 parts of trimethylbenzyl chloride, 100 parts of glacial acetic acid, and 50 parts of anhydrous zinc chloride. While the mixture was being stirred, butadiene was introduced over a period of an hour, during which time 65 parts had been added. During the butadiene addition the temperature was maintained at 25 to 35° C. The reaction mixture was stirred for an additional half hour at about 25° C., after which a portion of water was added. The product layer was washed twice with water, twice with aqueous 10% sodium carbonate, and then once more with water. The product was dried over magnesium sulfate, filtered, and distilled. The product distilled from 58° C./4 mm. to 161° C./1.9 mm. It had a chlorine content of 14.3 to 15.9% (15.9% theoretical). The product was identified as trimethylphenylpentenyl chloride.

Similarly, there was made trimethylphenylpentenyl bromide from trimethylbenzyl bromide and butadiene.

*Example 2*

There were added to a reaction vessel 77.3 parts of dimethylbenzyl chloride, 100 parts of glacial acetic acid, and 25 parts of zinc chloride. The mixture was stirred and butadiene was introduced over a fifty minute period until 47 parts had been added. The temperature was maintained at 25 to 30° C. during the butadiene addition and for twelve hours thereafter. Stirring was continued throughout the reaction period. Water was added to the reaction mixture causing layers to form. The product layer was washed with water twice, twice with aqueous 10% sodium carbonate, and once again with water. The product was dried over anhydrous magnesium sulfate and then filtered. The product distilled from 170° C./0.5 mm. to 190° C./0.5 mm. and had a chlorine content of 16.4% (17.0% theoretical). The product was identified as dimethylphenylpentenyl chloride.

Similarly, there was prepared methyloctadecylphenylpentenyl chloride from butadiene and methyloctadecylbenzyl chloride.

*Example 3*

To a reaction vessel there were added 139 parts of chloromethyldodecyltoluene, 100 parts of glacial acetic acid, and 20 parts of anhydrous zinc chloride. The mixture was stirred and butadiene was introduced over a period of one hour. A total of 28 parts of butadiene was added. During this time and for the duration of the reaction the temperature was maintained at 30 to 36° C. The reaction was continued for a period of 21 hours after the butadiene addition. At the conclusion of the reaction a portion of water was added to the reaction mixture causing a formation of layers. The product layer was washed twice with water, twice with aqueous 10% sodium carbonate, and once more with water. The product was dried over anhydrous magnesium sulfate, filtered, and distilled. The dried product distilled from 157° C./1.8 mm. to 213° C./1.0 mm. and had a chlorine content of 10.0% (9.8% theoretical). It had a molecular weight of 360±3 (363 theoretical). The product was identified as chloropentenyldodecyltoluene.

Similarly, there was prepared chloropentenyloctadecyltoluene from chloromethyloctadecyltoluene and butadiene.

*Example 4*

A mixture of 91.5 parts of chloromethyldurene, 100 parts of glacial formic acid, and 25 parts of anhydrous zinc bromide was added to a reaction vessel. Butadiene was added over a period of one hour during which time 32 parts was added. The mixture was stirred during this time and the temperature was maintained in the range of 25 to 45° C. The reaction was continued for a period of twelve hours after which a portion of water was added to the reaction mixture. Layers formed and the product layer was washed twice with water, twice with aqueous 10% sodium carbonate, and once with water. The product was dried over anhydrous magnesium sulfate and filtered. The product was identified as chloropentenyldurene.

Similarly there was prepared octadecyltrimethylphenylpentenyl chloride from octadecyltrimethylphenylmethyl chloride and butadiene.

*Example 5*

There were added together in a reaction vessel 168.5 parts of dodecyltrimethylphenylmethyl bromide, 100 parts of glacial formic acid, and 30 parts of anhydrous zinc bromide. The reaction mixture was stirred and the temperature was held at 30 to 50° C. during the addition of butadiene. A total of 35 parts of butadiene was introduced. The reaction was continued for a period of 20 hours while the previous conditions of temperature and stirring were maintained. At the conclusion of the reaction a portion of water was added to the reaction mixture causing the formation of layers. The product layer was washed well with water, then with aqueous 10% sodium carbonate, and finally with water. The product was dried over anhydrous magnesium sulfate and filtered. The product was identified as dodecyltrimethylphenylpentenyl bromide.

I claim:

1. A method for preparing polyalkylphenylpentenyl halides by reacting by bringing together the corresponding polyalkylphenylmethyl halides and butadiene in the presence of a Friedel-Crafts catalyst and in the temperature range of −10 to 75° C., the product having the formula

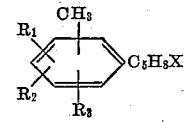

in which $R_1$ is a member of the class consisting of hydrogen and a methyl group, $R_2$ is a member of the class consisting of hydrogen and a methyl group, $R_3$ is an alkyl group of one to eighteen carbon atoms, and X is a member of the class consisting of chlorine and bromine.

2. A method for preparing polyalkylphenylpentenyl halides by reacting by bringing together the corresponding polyalkylphenylmethyl halides and butadiene in the presence of 0.5 to 25% by weight of a Friedel-Crafts catalyst and in the temperature range of −10 to 75° C., the product having the formula

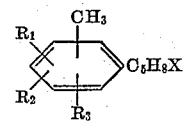

in which $R_1$ is a member of the class consisting of hydrogen and a methyl group, $R_2$ is a member of the class consisting of hydrogen and a methyl group, $R_3$ is an alkyl group of one to eighteen carbon atoms, and X is a member of the class consisting of chlorine and bromine.

3. A method for preparing polyalkylphenylpentenyl halides by reacting by bringing together the corresponding polyalkylphenylmethyl halides, and butadiene in the presence of a Friedel-Crafts catalyst and in the temperature range of 10 to 60° C., the product having the formula

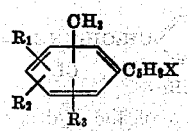

in which $R_1$ is a member of the class consisting of hydrogen and a methyl group, $R_2$ is a member of the class consisting of hydrogen and a methyl group, $R_3$ is an alkyl group of one to eighteen carbon atoms, and X is a member of the class consisting of chlorine and bromine.

4. A method for preparing polyalkylphenylpentenyl halides by reacting by bringing together the corresponding polyalkylphenylmethyl halides and butadiene in the temperature range of 10 to 60° C. in the presence of a Friedel-Crafts catalyst and a member from the class consisting of glacial acetic acid and glacial formic acid, the product having the formula

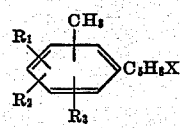

in which $R_1$ is a member of the class consisting of hydrogen and a methyl group, $R_2$ is a member of the class consisting of hydrogen and a methyl group, $R_3$ is an alkyl group of one to eighteen carbon atoms, and X is a member of the class consisting of chlorine and bromine.

5. A method for preparing polyalkylphenylpentenyl halides by reacting by bringing together the corresponding polyalkylphenylmethyl halides and butadiene in the temperature range of 10 to 60° C. in the presence of zinc chloride and glacial acetic acid, the product having the formula

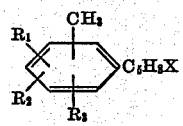

in which $R_1$ is a member of the class consisting of hydrogen and a methyl group, $R_2$ is a member of the class consisting of hydrogen and a methyl group, $R_3$ is an alkyl group of one to eighteen carbon atoms, and X is a member of the class consisting of chlorine and bromine.

6. A method for preparing polyalkylphenylpentenyl halides by reacting by bringing together the corresponding polyalkylphenylmethyl halides and butadiene in the temperature range of 10 to 60° C. in the presence of zinc bromide and glacial formic acid, the product having the formula

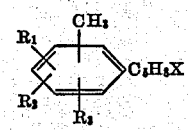

in which $R_1$ is a member of the class consisting of hydrogen and a methyl group, $R_2$ is a member of the class consisting of hydrogen and a methyl group, $R_3$ is an alkyl group of one to eighteen carbon atoms, and X is a member of the class consisting of chlorine and bromine.

7. A method for preparing dimethylphenylpentenyl chloride by reacting by bringing together dimethylphenylmethyl chloride and butadiene in the temperature range of 10 to 60° C. in the presence of a Friedel-Crafts catalyst and glacial acetic acid.

8. A method for preparing trimethylphenylpentenyl chloride by reacting by bringing together trimethylphenylmethyl chloride and butadiene in the temperature range of 10 to 60° C. in the presence of a Friedel-Crafts catalyst and glacial acetic acid.

9. A method for preparing tetramethylphenylpentenyl chloride by reacting by bringing together tetramethylphenylmethyl chloride and butadiene in the temperature range of 10 to 60° C. in the presence of a Friedel-Crafts catalyst and glacial acetic acid.

10. A method for preparing dodecylmethylphenylpentenyl chloride by reacting by bringing together dodecylmethylphenylmethyl chloride and butadiene in the temperature range of 10 to 60° C. in the presence of a Friedel-Crafts catalyst and glacial acetic acid.

11. As a composition of matter, a mixture of the isomers

and

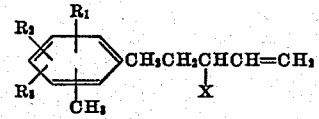

in which $R_1$ is a member of the class consisting of hydrogen and a methyl group, $R_2$ is a member of the class consisting a hydrogen and a methyl group, $R_3$ is an alkyl group of one to eighteen carbon atoms, and X is a member of the class consisting of chlorine and bromine, wherein the positions of $R_1$, $R_2$, $R_3$, and $CH_3$ are the same in each of the isomers and the $R_1$, $R_2$, and $R_3$ representations are the same in each of the isomers.

12. As a composition of matter, a mixture of the isomers

and

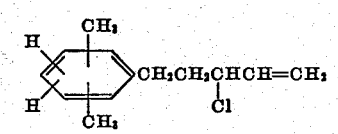

in which the positions of the hydrogen atoms and methyl groups on the benzene rings are the same in each of the isomers.

13. As a composition of matter, a mixture of the isomers

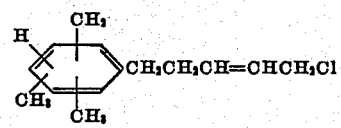

and

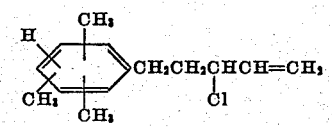

in which the positions of the hydrogen atom and the methyl groups on the benzene rings are the same in each of the isomers.

14. As a composition of matter, a mixture of the isomers

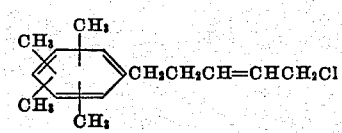

and
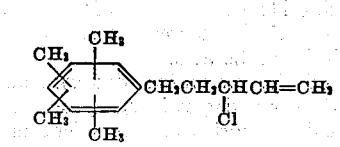
in which the positions of the methyl groups on the benzene rings are the same in each of the isomers.
15. As a composition of matter, a mixture of the isomers
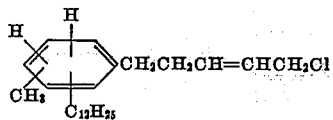
and
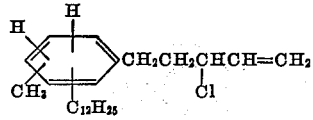
in which the positions of the hydrogen atoms and the methyl and dodecyl groups are the same in each of the isomers.
No references cited.